United States Patent [19]

Heinzl et al.

[11] 4,364,270

[45] Dec. 21, 1982

[54] DEVICE FOR PNEUMATICALLY SCANNING THE LEVEL OF LIQUID IN A CONTAINER

[75] Inventors: Alfred Heinzl; Heinz Stadler, both of Munich, Fed. Rep. of Germany

[73] Assignee: Siemens Aktiengesellschaft, Berlin & Munich, Fed. Rep. of Germany

[21] Appl. No.: 194,570

[22] Filed: Oct. 6, 1980

[30] Foreign Application Priority Data

Nov. 9, 1979 [DE] Fed. Rep. of Germany ....... 2945341

[51] Int. Cl.³ .......................................... G01B 13/14
[52] U.S. Cl. ..................................... 73/298; 73/37.5; 73/301
[58] Field of Search ................ 73/298, 37.5, 301, 299

[56] References Cited

U.S. PATENT DOCUMENTS 2,891,686  6/1959  Roberson et al. ..................... 73/37.5
3,459,035  8/1969  Russon ................................. 73/37.5

FOREIGN PATENT DOCUMENTS 1382706  2/1975  United Kingdom ................ 73/37.5

*Primary Examiner*—Donald O. Woodiel
*Attorney, Agent, or Firm*—Hill, Van Santen, Steadman, Chiara & Simpson

[57] ABSTRACT

A device for pneumatically scanning the level of liquid in a container, such as small housings for electronic components which are to be filled with casting resin, has a pneumatic scanning nozzle disposed above the component housing for directing an extremely low pressure air stream at the liquid surface in the housing. The nozzle has a branch conduit leading to a piston movable to actuate a proximity switch for providing a signal to cease the supply of liquid to the container. When a pre-determined liquid level is attained in the container, the back pressure through the conduit moves the piston against a spring bias to actuate the proximity switch. The liquid level is thus determined in a contact-free manner so that the measuring system remains untouched by the casting resin.

7 Claims, 2 Drawing Figures

DEVICE FOR PNEUMATICALLY SCANNING THE LEVEL OF LIQUID IN A CONTAINER

BACKGROUND OF THE INVENTION

1. Field of the Invention

The present invention relates to devices for scanning the level of liquid media in a container, and in particular to such devices utilizing a pneumatic nozzle to direct a compressed air supply over the surface of the liquid.

2. Description of the Prior Art

Various methods and devices are known to those skilled in the art for measuring the level of liquid in containers which are being filled to a pre-determined level. Such conventional methods and devices fail to accurately monitor the level of liquid in very small containers such as, for example, electric components such as miniature relays which have a housing which is to be filled with casting resin. Moreover, in the particular situation of viscous material such as casting resins, it is preferable that the scanning take place in contact-free fashion in order to prevent the casting compound from hardening about the scanning device. Finally, such scanning must be able to take into consideration the presence of curved surfaces such as arise in small components of this type due to the surface tension and wetting.

Although contact-free pneumatic scanning is known for use in scanning solid bodies, previous scanning devices have been unsuitable for use in the casting of relays to ensure automatic disconnection and termination of the casting process when a desired fill level of casting resin has been supplied to the component housing. In particular, such known pneumatic scanning devices operate at a relatively high pressure so that the scanning air flow directed against the liquid surface changes the liquid surface and thereby prevents an accurate measurement. Moreover, the air flow is of such a high pressure that measurement of extremely thin liquid layers is effectively prevented.

SUMMARY OF THE INVENTION

It is an object of the present invention to provide a device for scanning the level of liquid in a container which provides an indication that a pre-determined liquid level has been reached in the container. It is a further object of the invention to undertake such a measurement in a contact-free fashion and without influencing the surface of the liquid. It is a further object of the present invention to provide such a scanning device which can undertake such a measurement within a constricted area and even in an atmosphere of harmful substances. It is another object of the invention to undertake such a scanning of casting compounds in electrical components by which extremely thin layers can be reliably measured.

The above objects are inventively achieved in a device having a pressure tube terminating in a nozzle which is disposed above a housing which is to be filled with a liquid. The pressure tube has a branch leading to a displaceable piston which is normally maintained out of contact with a proximity switch by means of spring bias or other supporting means. When a pre-determined level of liquid is supplied to the housing to be filed, a back pressure is created which displaces the piston into contact with the proximity switch which in turn provides an electric signal for ceasing supply of liquid to the container.

The above-described scanning device allows the use of an extremely low pressure in the scanning nozzle so that the liquid surface is not affected thereby. The proximity switch operates in contact-free fashion and thereby ensures that no force which would require an increased pressure in scanning need be applied for the switching process. It is thus possible to scan even very thin casting compound layers such as, for example, layers of less than 0.3 mm in thickness.

In order to operate at such extremely low pressure, it is preferable that the piston be designed as light as possible, for example the piston may be formed as a hollow body composed of thin-walled sheet metal. In one embodiment of the invention the piston is held in a piston housing with one or two leaf membrane springs in such a manner that the piston does not touch the walls of the piston housing. The piston thus moves in essentially friction-free manner within the piston housing and is insensitive to sticky deposits of casting compound vapors, dust and solvent vapors. The membrane springs may be of a suitable design such as, for example, having a very low spring constant and having recesses or cross sectional reductions in thickness so as to insure that the bias relative to the air pressure is as slight as possible. Thus, even a very small excess pressure is sufficient to move the piston and thereby actuate the proximity switch.

Instead of supporting the piston by membrane springs, such support can also be achieved in the piston housing by compensation springs, such as screw springs, which operate in perpendicular fashion. The proximity sensor may be located at any point in the piston housing in the direction of movement of the piston.

The proximity switch which operates in contact-free manner can operate in accordance with known principles, such as, for example capacitively or electrostatically. Switches of this type are commercially available and are well known to those skilled in the art. In order to compliment the design of the scanning device disclosed herein, however, it is preferable that the proximity switch be attached to the piston housing and be provided with a proximity sensor which extends essentially in the form of a rod into the piston. As the piston base approaches the proximity sensor the switch is actuated. In a further development of the invention it is provided that the distance between the proximity sensor and the piston is adjustable. This can be achieved, for example, by a set screw which adjusts the position of the proximity sensor relative to the housing and consequently adjusts the distance between the proximity sensor and the piston base. It is thus possible, without adjusting the scanning nozzle, to set the level at which the proximity switch is to respond to the back pressure to terminate the casting process.

DESCRIPTION OF THE PREFERRED EMBODIMENTS

Figure 1:
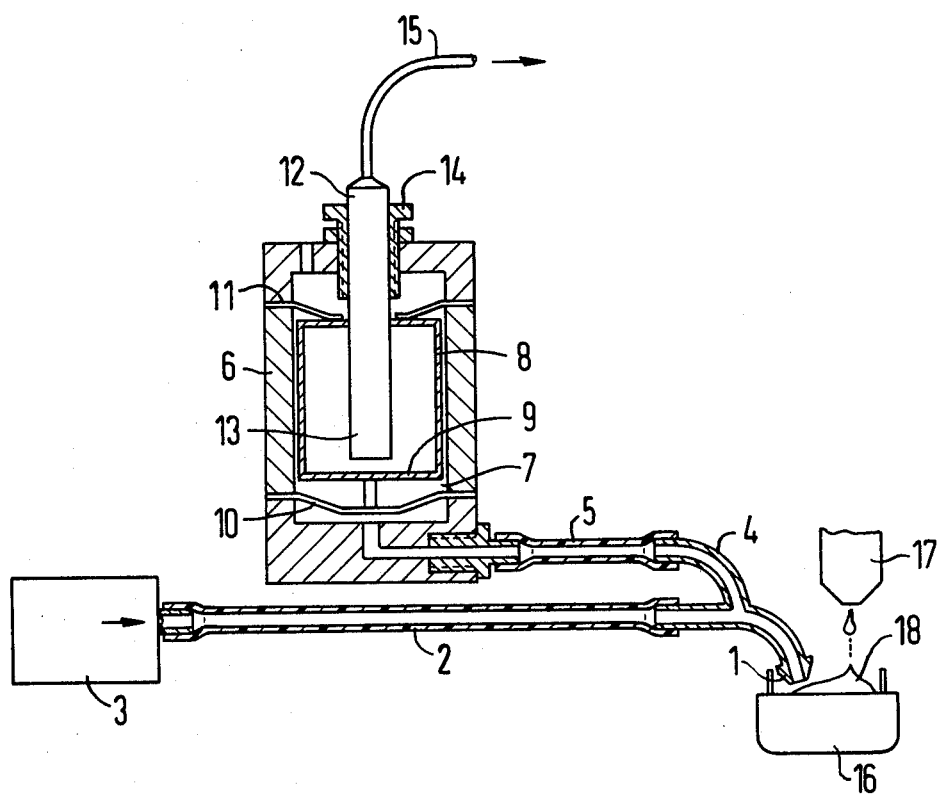
FIG. 1 is a sectional view of a pneumatic scanning device constructed in accordance with the principles of the present invention in cross section.

As shown in FIG. 1, a pneumatic scanning device has a scanning nozzle 1 which is connected via a pipe 2 to a compressed air supply 3. The scanning nozzle 1 is also connected to a pressure tube 4 which leads via a pipe 5 to a piston housing 6. The housing 6 contains a cylindrical hollow chamber 7 in which a piston 8 is slidably mounted for vertical displacement therein. The piston 8 may consist of a thin-walled hollow cylinder and has a closed base 9. The piston 8 is supported in the housing 6 by two membrane springs 10 and 11 in such a manner that the piston 8 does not touch the interior walls of the chamber 7. The membrane springs 10 and 11 are designed so as to center the piston 8 in the chamber 7, and have very low spring constants.

The housing 6 further contains a contact-free switch 12 in the form of a rod-like proximity sensor disposed concentrically with the piston 8. The proximity sensor projects through an opening in the upper portion of the piston 8 into the interior of the piston and has an end 13 disposed at a determinate distance from the base area 9 of the piston. A set screw 14 serves to adjust the proximity sensor in the axial direction and thus permits adjustment of the distance between the end 13 and the piston base 9. When actuated by proximity to the base 9, the proximity switch 12 emits a signal on a line 15.

The following explanation of the operation of the scanning device will be undertaken in the context of the casting of an electric component such as, for example, a relay referenced at 16 in the Fig. The relay 16 is to be filled with a casting resin 18 from a casting head 17 partially illustrated in the Fig. Any suitable casting means can be utilized as is known in the art and forms no portion of the present invention. As the casting resin 18 is supplied to the component 16, air is discharged through the scanning nozzle 1 from the compressed air supply 3 at a pre-determined pressure. As the surface of the casting compound 18 in the component 16 approaches the scanning nozzle 1, an excess or back pressure occurs which is transmitted via the pressure tube 4 and the pipe 5 onto the surface of the piston 8 and thus raises the piston 8 in the housing 6. The piston base 9 now approaches the end 13 of the proximity switch 12. At a specific pre-determined pressure the proximity switch is actuated and emits a signal on line 15 to a means such as a valve associated with the casting head 17 which interrupts the supply of casting compound 18 to the component 16.

The excess pressure of the air at the scanning nozzle 1 is extremely low, approximately on the order of 50 microbars, so that the surface of the casting compound is not influenced by the air flow. The system operates reliably even in the event of fluctuations in air pressure and pressure surges. Moreover, the device is insensitive to sticky deposits and other impurities due to the fact that the piston 8 is mounted in essentially friction-free fashion within the housing 6. Although the device has particular utility in the context of scanning levels of viscous material such as casting resin, the device may be utilized in any context wherein a liquid level is to be monitored.

Figure 2:
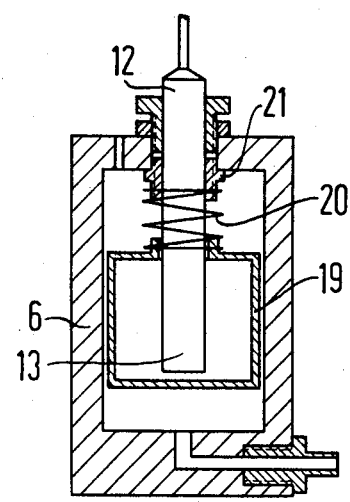
FIG. 2 is a sectional view of a portion of the device shown in FIG. 1 illustrating a second embodiment.

A second embodiment for suspending the piston 19 in the housing 6 is shown in FIG. 2, wherein elements identical to those previously described in connection with FIG. 1 are identically referenced. In place of the leaf springs 10 and 11 in the embodiment of FIG. 1, the embodiment of FIG. 2 utilizes a helical spring 20 which engages an upper portion of the piston 19 and is held in an upper portion of the interior of the housing 6 by means of a retaining ring 21. The helical spring 20 permits vertical movement of the piston 19 so that the piston 19 can be moved to the end 13 of the proximity switch 12 as a result of a change in pressure in the interior of the cylinder 6.

Although modifications and changes may be suggested by those skilled in the art, it is the intention of the inventors to embody within the patent warrented hereon all changes and modifications as reasonably and properly come within the scope of their contribution to the art.

We claim as our invention:
1. A device for scanning the level of liquid in a container comprising:
   a scanning nozzle connected to a compressed air supply, said nozzle disposed above said container for directing air at a surface of said liquid in said container;
   a housing having an interior chamber;
   a piston contained in said chamber in contact-free fashion;
   a means for supporting said piston in said chamber and for permitting displacement of said piston in said chamber;
   a proximity switch disposed in said chamber a distance from a portion of said piston for emitting a signal when said distance is reduced by a pre-determined amount by displacement of said piston toward said switch; and
   a pressure tube interconnected between said chamber of said housing and said nozzle for directing back pressure to said chamber when said liquid in said container reaches a pre-determined level, whereby said back pressure displaces said piston into contact with said proximity switch for actuation thereof.
2. The device of claim 1 wherein said piston is a hollow piston formed from thin-walled sheet metal.
3. The device of claim 1 wherein said means for supporting said piston in said chamber is at least one leaf spring.
4. The device of claim 1 wherein said means for supporting said piston in said chamber is at least one perpendicularly disposed tension spring.
5. The device of claim 1 wherein said proximity switch has a rod-like proximity sensor extending into an interior of said piston.
6. The device of claim 1 further comprising a means for adjusting the position of said proximity switch with respect to said piston.
7. The device of claim 6 wherein said means for adjusting the position of said proximity switch is a set screw surrounding said switch and received in said housing.

* * * * *